No. 854,935. PATENTED MAY 28, 1907.
J. A. DOREE.
STOVEPIPE ELBOW.
APPLICATION FILED JUNE 18, 1906.

WITNESSES:
Gertrude M. Beckman
O. J. Wheeler
A. Johnson

INVENTOR.
James A. Doree
BY
James T. Watson
ATTORNEY.

UNITED STATES PATENT OFFICE.

JAMES A. DOREE, OF CLOQUET, MINNESOTA.

STOVEPIPE-ELBOW.

No. 854,935.

Specification of Letters Patent.

Patented May 28, 1907.

Application filed June 18, 1906. Serial No. 322,170.

*To all whom it may concern:*

Be it known that I, JAMES A. DOREE, a citizen of the United States, residing at Cloquet, in the county of Carlton and State of Minnesota, have invented certain new and useful Improvements in Stovepipe-Elbows; and I do hereby declare the following to be a full, clear, and exact description of the invention, such as will enable others skilled in the art to which it appertains to make and use the same.

My invention relates to stove pipe elbow and means for cleaning the same, and has for its object the provision of an elbow of improved construction provided with a cleaning out aperture and means of improved construction for closing said aperture.

With this and other objects in view it consists of the constructions, combinations and arrangements of parts hereinafter described and claimed.

Figure 1:
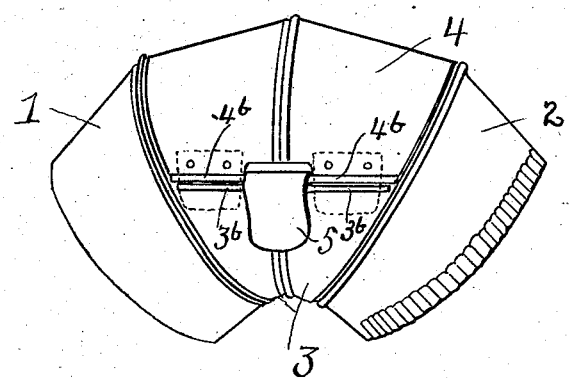
Figure 2:
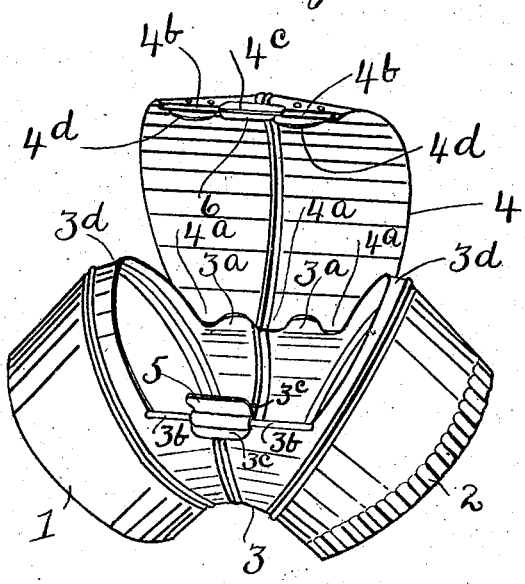

In the drawings Figure 1 is a perspective view of an elbow constructed in accordance with my invention, the cleaning out aperture being closed. Fig. 2, is a perspective view of the same, showing the cleaning out aperture opened.

In the drawings, 1 and 2 are the fixed end sections of the body portion of the elbow and 3 is the stationary portion of the central section thereof. These sections may be secured together, or, possibly, made in one piece, by any method well known to those skilled in sheet metal working, and especially to those skilled in the art of making stove pipe elbows. Said central section has a large aperture formed in the convex or longest side thereof, and one longitudinal edge thereof is cut so as to form a series of fingers as $3^a$, which are alternately bent inwardly and outwardly. These outwardly bent fingers are rolled, to form part of a hinge for a closing door 4. The inwardly bent fingers are free at their inner ends. The other longitudinal edge of said section 3, is cut so as to form a series of fingers which are alternately pressed outwardly and inwardly. The latter said outwardly pressed fingers are rolled so as to form the bearings $3^b$ of a shaft to which is secured a tongue or lever 5. The latter said inwardly pressed finger projects inwardly behind said tongue, as at $3^c$. Mounted upon said section 3, is a cover 4, which overlaps the opposing ends $3^d$ of the aperture, and is hinged to said section by a suitable hinge; one edge of said cover being cut so as to form a series of fingers $4^a$ which are alternately pressed inwardly and outwardly so as to interlock with said fingers $3^a$. The latter said outwardly pressed fingers are rolled so as to form part of said hinge; the outwardly pressed fingers $3^a$ being behind the inwardly directed fingers $4^a$ and so not shown on the drawing, and the rolls of the outwardly pressed fingers $3^a$ and $4^a$ are in alinement with each other and adapted to receive the hinge pin. (Not shown.) The opposite longitudinal edge of said cover is cut so as to form a series of fingers alternately bent inwardly and outwardly; said outwardly bent fingers being rolled as at $4^b$ and adapted to receive a pin or shaft $4^c$ mounted therein. Other inwardly pressed fingers $4^d$ are riveted to said cover and lie behind, and extend below the rolled outwardly pressed fingers $4^b$. In closing said aperture, the cover is swung down on its hinge and free end of the tongue 5 is directed upwardly through the space between said bar or shaft $4^c$ and the inwardly directed finger 6. The free end of the tongue is then swung downwardly in the arc of a circle, thus drawing the edges of the cover and of the section 3, closely together. At this time the inwardly pressed finger 6 on the free edge of the cover will project into the space between the tongue and the inwardly pressed finger $3^c$. The inwardly pressed fingers $4^a$ will lightly press outwardly against the inner face of the adjoining longitudinal edge of the section 3; the inwardly directed fingers $3^a$ will lightly press outwardly against the adjoining longitudinal edge of said cover, and the inwardly pressed fingers $4^d$ will lightly press outwardly against the inner face of the adjoining longitudinal wall of the section 3. It is obvious that the cover may, by means of said tongue, operating as a lever, be drawn into exceedingly close relationship to the remaining part of said section 3, and that the overlapping edges and interlocking fingers will assist in effecting a substantially tight closure through which gases will not tend to escape from the pipe nor large quantities of air enter the same.

It is obvious that, if desired, the tongue 5 may be mounted on the cover and the bar $4^c$ may be mounted on the body of the elbow, which I regard as a mechanically equivalent construction to that more particularly described; and it is further obvious that the construction shown may be further modified in minor details, without departing from the spirit and scope of my invention.

In operation, the cover of the elbow is raised and any suitable scraper is used for sweeping the pipe, in and beyond the elbow; the scraper handle being lengthened or shortened, as desired.

I am aware that patents have been issued for stove pipe elbows provided with cleaning out apertures and with covers therefor; I do not therefore claim the same broadly.

What I claim is,

1. In a stove pipe elbow, the combination of a body portion, provided with a cleaning out aperture, and having inwardly and outwardly bent fingers formed upon the opposite longitudinal edges of said aperture, the outwardly bent fingers upon one of said edges being rolled to form a part of a hinge, and the outwardly bent fingers upon the opposite of said edges being rolled to form supports for a shaft, a tongue formed upon or mounted on said shaft, and a hinged cover for said aperture, said cover having outwardly and inwardly bent fingers formed upon its hinged edge said outwardly bent fingers forming part of the hinge and the inwardly bent fingers alternating and interlocking with the inwardly bent fingers upon the adjoining edge of said body portion, said cover having outwardly and inwardly bent fingers upon its opposite or free longitudinal edge, the latter said outwardly bent finger forming a support for a shaft extending longitudinally of said elbow and adapted to engage the tongue, said free edge of the cover being provided with other inwardly bent fingers attached thereto, substantially as described.

2. In a stove pipe elbow, the combination of a body portion having a cleaning out aperture formed therein intermediate of its ends and provided with fingers formed upon the longitudinal edges of said aperture, a cover for said aperture adapted to overlap the ends of the aperture and provided at its longitudinal edges with fingers adapted to alternate with and interlock with said fingers formed upon the longitudinal edges of said body portion, and means for locking said cover in closed position.

3. In a stove pipe elbow, the combination of a body portion, having a cleaning out aperture formed therein intermediate of its ends, a cover portion, for said aperture, hinged upon said body portion, the edges of said cover portion being adapted to extend over the edges of said body portion, a lever mounted upon one of said portions and adapted to engage the other of said portions for drawing said portions into close relation to each other and holding them there.

4. In a stove pipe elbow, the combination of a body portion open at each end and having an aperture formed therein intermediate of its ends, and a cover portion, each of said portions having fingers extending from its longitudinal edges, the fingers on each portion being adapted, when said cover is closed, to extend within the opposite portion.

5. In a stove pipe elbow, the combination of a body portion open at each end and having an aperture formed therein intermediate of its ends, and a cover portion each having fingers provided upon its longitudinal edges, some of said fingers on each of said portions being bent inwardly and some of said fingers being bent outwardly.

6. In a stove pipe elbow, the combination of a body portion having an aperture formed therein intermediate of its ends, a curved finger extending from one of the longitudinal edges of said aperture, a shaft or pin grasped by said finger, a curved finger extending from one of the longitudinal edges of said cover, a shaft or pin grasped by the second said finger, and a curved tongue supported by one of said shafts and adapted to engage the other of said shafts.

In testimony whereof I hereunto affix my signature, in presence of two witnesses.

JAMES A. DOREE.

Witnesses:
FRED C. JOHNSON,
JAMES WALKER.